(12) United States Patent
Uehara et al.

(10) Patent No.: US 9,677,669 B2
(45) Date of Patent: Jun. 13, 2017

(54) SHAFT SEAL DEVICE AND ROTARY MACHINE

(71) Applicant: MITSUBISHI HITACHI POWER SYSTEMS, LTD., Kanagawa (JP)

(72) Inventors: Hidekazu Uehara, Tokyo (JP); Shin Nishimoto, Tokyo (JP); Tanehiro Shinohara, Tokyo (JP); Hiroharu Oyama, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/769,241

(22) PCT Filed: Feb. 13, 2014

(86) PCT No.: PCT/JP2014/053282
§ 371 (c)(1),
(2) Date: Aug. 20, 2015

(87) PCT Pub. No.: WO2014/129371
PCT Pub. Date: Aug. 28, 2014

(65) Prior Publication Data
US 2016/0010751 A1 Jan. 14, 2016

(30) Foreign Application Priority Data

Feb. 22, 2013 (JP) .................... 2013-033202

(51) Int. Cl.
*F16J 15/3292* (2016.01)
*F01D 11/00* (2006.01)
*F16J 15/3252* (2016.01)

(52) U.S. Cl.
CPC ......... *F16J 15/3292* (2013.01); *F01D 11/001* (2013.01); *F16J 15/3252* (2013.01); *F05D 2240/59* (2013.01)

(58) Field of Classification Search
CPC ............... F05D 2240/59; F16J 15/3292; F16J 15/3252; F01D 11/001; F05B 2240/572; F05B 2240/571; F05B 2240/57
(Continued)

(56) References Cited

U.S. PATENT DOCUMENTS 5,201,530 A * 4/1993 Kelch .................. F16J 15/3288
                                                            277/355
6,267,381 B1   7/2001 Wright
(Continued)

FOREIGN PATENT DOCUMENTS

CN       1410690       4/2003
CN       1573024       2/2005
(Continued)

OTHER PUBLICATIONS

International Search Report issued Apr. 22, 2014 in corresponding International Application No. PCT/JP2014/053282 (with English translation).
(Continued)

*Primary Examiner* — Kristina Fulton
*Assistant Examiner* — Eugene G Byrd
(74) *Attorney, Agent, or Firm* — Wenderoth, Lind & Ponack, L.L.P.

(57) ABSTRACT

Disclosed is a shaft seal device comprising: a seal body made by layering a plurality of thin-plate seal pieces in the circumferential direction of the rotor, and a housing that is fixed to the stator, holds the seal body so as to surround the same from radially outside, and includes a first facing surface that faces the high-pressure-side edge of the seal body and a second facing surface that faces the low-pressure-side edge of the seal body. The high-pressure-side clearance between the seal body and the first facing surface is smaller than the low-pressure-side clearance between the
(Continued)

seal body and the second facing surface, and a slope part that slopes gradually toward the high-pressure side toward the tip end, which is on the rotor side, is formed in the low-pressure-side edge of each thin-plate seal piece of the seal body.

4 Claims, 10 Drawing Sheets

(58) Field of Classification Search
USPC .......................................................... 277/355
See application file for complete search history.

(56) References Cited

U.S. PATENT DOCUMENTS

| | | | | |
|---|---|---|---|---|
| 7,201,378 | B2* | 4/2007 | Kono | F16J 15/3292 |
| | | | | 277/355 |
| 7,226,053 | B2* | 6/2007 | Nakano | F16J 15/3292 |
| | | | | 277/355 |
| 7,364,165 | B2* | 4/2008 | Nakano | F16J 15/3292 |
| | | | | 277/355 |
| 8,152,462 | B1* | 4/2012 | Williams | F01D 11/02 |
| | | | | 277/355 |
| 9,039,014 | B2* | 5/2015 | Pekris | F16J 15/406 |
| | | | | 277/431 |
| 9,057,444 | B2* | 6/2015 | Jahn | F01D 11/001 |
| 9,206,905 | B2* | 12/2015 | Franceschini | F16J 15/3292 |
| 2002/0105146 | A1 | 8/2002 | Uehara et al. | |
| 2002/0117807 | A1 | 8/2002 | Yoshida et al. | |
| 2002/0190474 | A1 | 12/2002 | Turnquist et al. | |
| 2003/0062686 | A1* | 4/2003 | Uehara | F16J 15/3292 |
| | | | | 277/411 |
| 2008/0169616 | A1 | 7/2008 | Awtar et al. | |
| 2008/0309018 | A1* | 12/2008 | Williams | F01D 11/003 |
| | | | | 277/411 |
| 2010/0025936 | A1* | 2/2010 | Nicholson | F16J 15/3292 |
| | | | | 277/411 |
| 2011/0309585 | A1 | 12/2011 | Uehara et al. | |
| 2012/0261884 | A1* | 10/2012 | Uehara | F01D 11/001 |
| | | | | 277/411 |

FOREIGN PATENT DOCUMENTS

| | | |
|---|---|---|
| GB | 2 286 434 | 8/1995 |
| JP | 11-513781 | 11/1999 |
| JP | 2002-13647 | 1/2002 |
| JP | 3616016 | 2/2005 |
| JP | 2006-52765 | 2/2006 |
| JP | 2008-509369 | 3/2008 |
| JP | 2012-177420 | 9/2012 |
| WO | 2006/016098 | 2/2006 |
| WO | 2010/146805 | 12/2010 |

OTHER PUBLICATIONS

Written Opinion of the International Searching Authority issued Apr. 22, 2014 in corresponding International Application No. PCT/JP2014/053282 (with English translation).
Office Action issued Jan. 4, 2016 in corresponding Chinese Application No. 201480003696.1 (with partial English translation).

* cited by examiner

SHAFT SEAL DEVICE AND ROTARY MACHINE

TECHNICAL FIELD

The present invention relates to a shaft seal device that seals an annular space between a rotor and a stator and divides the annular space into a low-pressure-side region and a high-pressure-side region, and a rotary machine.

Priority is claimed on Japanese Patent Application No. 2013-033202, filed Feb. 22, 2013, the content of which is incorporated herein by reference.

BACKGROUND ART

A shaft seal device is provided around a rotor of a rotary machine, such as a gas turbine or a steam turbine, to reduce the leakage rate of working fluid flowing to the low-pressure side from the high-pressure side. For example, a shaft seal device disclosed in the following PTL 1 is known as an example of the shaft seal device.

FIG. 9 is a view showing the schematic structure of a shaft seal device in the related art. The shaft seal device 110 includes a housing 109 that is supported by the inner peripheral surface of a stator, and a seal body 112 that is disposed in a circumferential direction in the housing 109.

The seal body 112 includes a plurality of thin-plate seal pieces 120 that are laminated with a minute gap therebetween so that the thickness direction (the direction of the plane of paper of FIG. 9) of each thin-plate seal piece is parallel to the circumferential direction of the rotor (rotating shaft 6). Each thin-plate seal piece 120 is obliquely disposed so that an inner end portion (tip) of each thin-plate seal piece 120 in the radial direction of the rotor is positioned on the front side of a radially outer end portion (rear end) thereof in the rotational direction of the rotor. Rear ends of the thin-plate seal pieces 120 are connected to each other through a soldering portion 24, and tips thereof become free ends.

The thin-plate seal piece 120 of the seal body 112 is a flat plate-like member that has a predetermined width in the direction of the axis of the rotor. The seal body 112 is formed in a T shape having a head 120d, and the housing 109 includes a T-shaped internal space 109a corresponding to the T shape.

In the shaft seal device 110 having this schematic structure, the tips of the thin-plate seal pieces 120 come into contact with the rotor when the rotor stops. Further, when the rotor rotates, the tips of the thin-plate seal pieces 120 float from the outer periphery of the rotor by a dynamic pressure effect that is caused by the rotation of the rotor. Accordingly, the tips of the thin-plate seal pieces 120 do not come into contact with the rotor. For this reason, the wear of the thin-plate seal pieces 120 is suppressed in the shaft seal device 110. Accordingly, the life of the seal is lengthened.

CITATION LIST

Patent Literature

[PTL 1] Japanese Patent No. 3616016
[PTL 2] PCT Japanese Translation Patent Publication No. 2008-509369

SUMMARY OF INVENTION

Technical Problem

Incidentally, when the shaft seal device 110 in the related art is applied to a position where a relative eccentricity between the rotor and the stator is large, that is, when the center of rotation of the rotor deviates from a design center of rotation, a difference occurs in the pressing force of the thin-plate seal piece 120 in the circumferential direction.

That is, the rotor is eccentric from the stator, an interval between the rotor and the stator is locally reduced so that a large pressing force is generated, and an interval between the rotor and the stator is increased so that a pressing force becomes excessively small. Accordingly, as shown in FIG. 10, the stiffness of the thin-plate seal pieces 120 is increased and the floating characteristics of the thin-plate seal pieces 120 deteriorate at a position where an excessively large pressing force is generated. Therefore, there is a possibility that wear may occur. Further, as shown in FIG. 11, gaps G1 and G2 are increased and leakage is increased at the position where a pressing force is excessively small.

PTL 2 discloses a shaft seal device that suppresses the change of floating characteristics even when a rotor is eccentric since an end edge of a seal body is chamfered.

However, since a gap between a seal body 112 and a housing 109 is not defined in the shaft seal device disclosed in PTL 2, there is a problem in that it is difficult to adjust floating characteristics.

An object of the invention is to provide a shaft seal device that can suppress the wear of thin-plate seal pieces of the shaft seal device and suppress leakage to a low-pressure side from a high-pressure side even when a relative eccentricity between a rotor and a stator is increased.

Solution to Problem

According to a first aspect of the invention, there is provided a shaft seal device that partitions a space between a rotor and a stator into a high-pressure side and a low-pressure side. The shaft seal device includes: a seal body that includes a plurality of thin-plate seal pieces extending toward the rotor from the stator and laminated in a circumferential direction of the rotor; and a housing that is fixed to the stator and holds the seal body so as to surround the seal body from the outside in a radial direction, and includes a first facing surface facing a high-pressure-side edge of the seal body and a second facing surface facing a low-pressure-side edge of the seal body. A high-pressure-side clearance between the seal body and the first facing surface is set to be smaller than a low-pressure-side clearance between the seal body and the second facing surface, and a slope part, which gradually slopes to the high-pressure side toward a tip close to the rotor, is formed at the low-pressure-side edge of each thin-plate seal piece of the seal body.

According to the above-mentioned structure, the floating force of the thin-plate seal piece is increased as the amount of pressing is increased. Accordingly, it is possible to prevent the wear of the thin-plate seal piece. Further, since the floating force of the thin-plate seal piece is reduced when the amount of pressing is reduced, it is possible to suppress leakage.

Furthermore, since the high-pressure-side clearance is set to be smaller than the low-pressure-side clearance, it is easy to control pressure between the thin-plate seal pieces that is caused by the low-pressure-side clearance changed by the slope part of the low-pressure-side edge.

In the shaft seal device, the slope part may be formed from the tip to a position corresponding to an end of the second facing surface close to the rotor.

In the shaft seal device, an end portion of the second facing surface close to the rotor may slope along the slope part.

According to the above-mentioned structure, it is possible to adjust the amount of change of the low-pressure-side clearance that is caused by the change of the amount of pressing.

In the shaft seal device, a high-pressure-side side plate, which defines the high-pressure-side clearance, may be mounted on the high-pressure-side edge.

According to the above-mentioned structure, since the high-pressure-side clearance is defined by the high-pressure-side side plate, it is easier to control the pressure between the thin-plate seal pieces.

Further, the invention provides a rotary machine that includes any one of the above-mentioned shaft seal devices.

Advantageous Effects of Invention

According to the invention, the floating force of the thin-plate seal piece is increased as the amount of pressing is increased. Accordingly, it is possible to prevent the wear of the thin-plate seal piece. Further, since the floating force of the thin-plate seal piece is reduced when the amount of pressing is reduced, it is possible to suppress leakage.

DESCRIPTION OF EMBODIMENTS

First Embodiment

A rotary machine according to a first embodiment of the invention will be described below with reference to the drawings.

Figure 1:
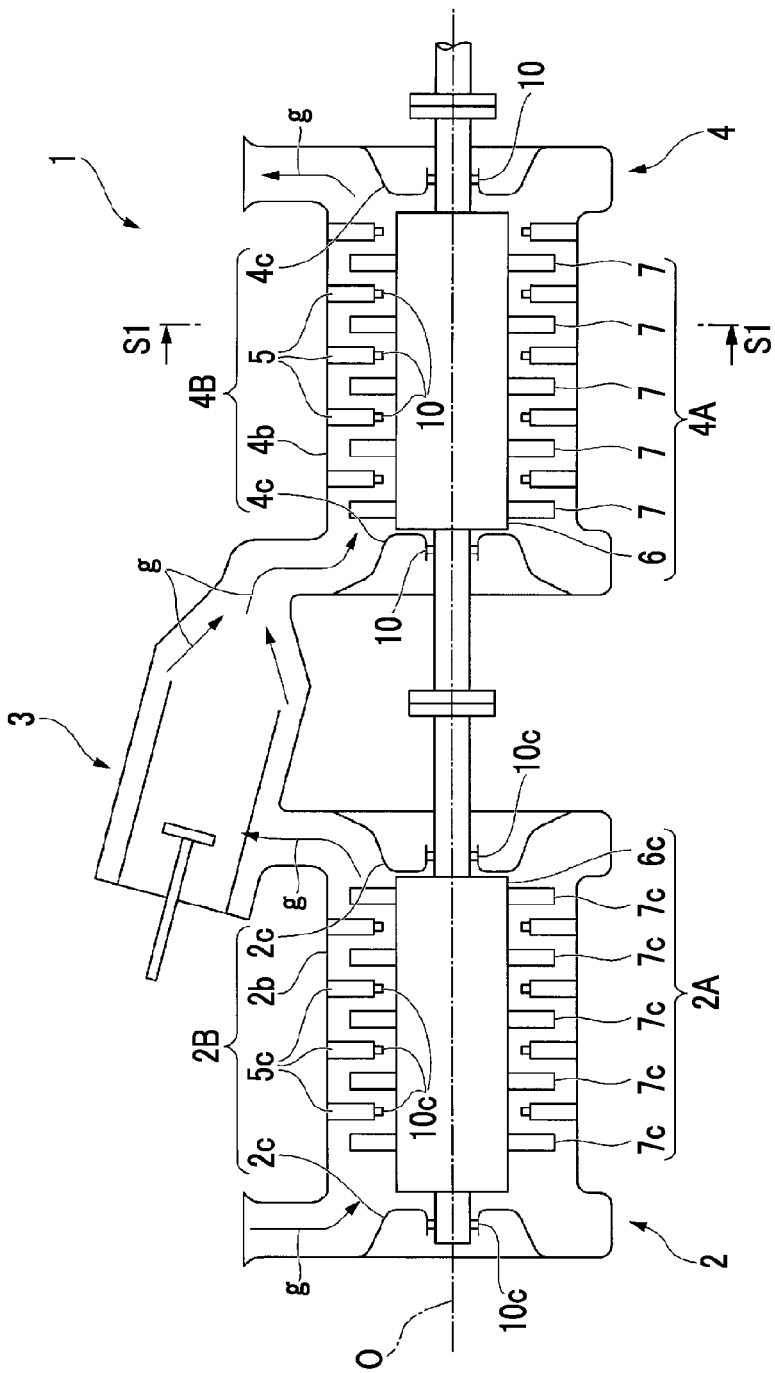
FIG. 1 is a view showing the schematic structure of a gas turbine according to a first embodiment of the invention.

FIG. 1 is a view showing the schematic structure of the entire gas turbine (rotary machine) 1 according to this embodiment.

As shown in FIG. 1, the gas turbine 1 includes a compressor (rotary machine) 2 that receives and compresses a large amount of air, a combustor 3 that mixes fuel with the air compressed by the compressor 2 and combusts a mixture, and a turbine (rotary machine) 4 that converts the thermal energy of combustion gas introduced from the combustor 3 into rotational energy.

The compressor 2 and the turbine 4 include rotors 2A and 4A that are connected so as to rotate integrally and stators 2B and 4B that surround the outer peripheral sides of the rotors 2A and 4A, respectively. Meanwhile, as long as not particularly described in the following description, the directions of axes O of the rotors 2A and 4A are simply referred to as "the directions of axes O", the circumferential directions of the rotors 2A and 4A are simply referred to as "the circumferential directions", and the radial directions of the rotors 2A and 4A are simply referred to as "the radial directions".

The rotors 2A and 4A include rotating shafts 6c and 6 and a plurality of annular rotor blade groups 7c and 7 that are fixed at intervals in the directions of the axes O. Each of the annular rotor blade groups 7c and 7 includes a plurality of rotor blades that are fixed to the outer periphery of each of the rotating shafts 6c and 6 at intervals in the circumferential direction.

The stators 2B and 4B include casings 2b and 4b and a plurality of annular stator blade groups 5c and 5 that are fixed in the casings 2b and 4b at intervals in the directions of the axes O. Each of the annular stator blade groups 5c and 5 includes a plurality of stator blades that are fixed to the inner surface of each of the casings 2b and 4b at intervals in the circumferential direction. A hub shroud is formed at the tip of each stator blade. The hub shrouds (stators) are connected to each other in the circumferential direction, are formed in an annular shape as a whole, and surround the outer peripheries of the rotating shafts 6c and 6.

The annular stator blade groups 5c and 5 and the plurality of annular rotor blade groups 7c and 7 are alternately disposed in the directions of the axes O, respectively.

As shown in FIG. 1, shaft seal devices 10c and 10 are provided at the hub shrouds of the respective annular stator blade groups 5c and 5 of the compressor 2 and the turbine 4 in order to prevent working fluid (compressed air or combustion gas) g from leaking to a low-pressure side from a high-pressure side in the directions of the axes O. Further, shaft seal devices 10c and 10 are provided even at bearing portions (stator) 2c and 4c, which support the rotating shafts 6c and 6, of the casings 2b and 4b in order to prevent the working fluid g from leaking to the low-pressure side from the high-pressure side.

An embodiment of the shaft seal device 10 of the turbine 4 will be described. Meanwhile, the shaft seal device 10 of the turbine 4 will be described below. However, since the shaft seal device 10c of the compressor 2 also has basically the same structure as the shaft seal device 10, the description thereof will be omitted.

Figure 2:
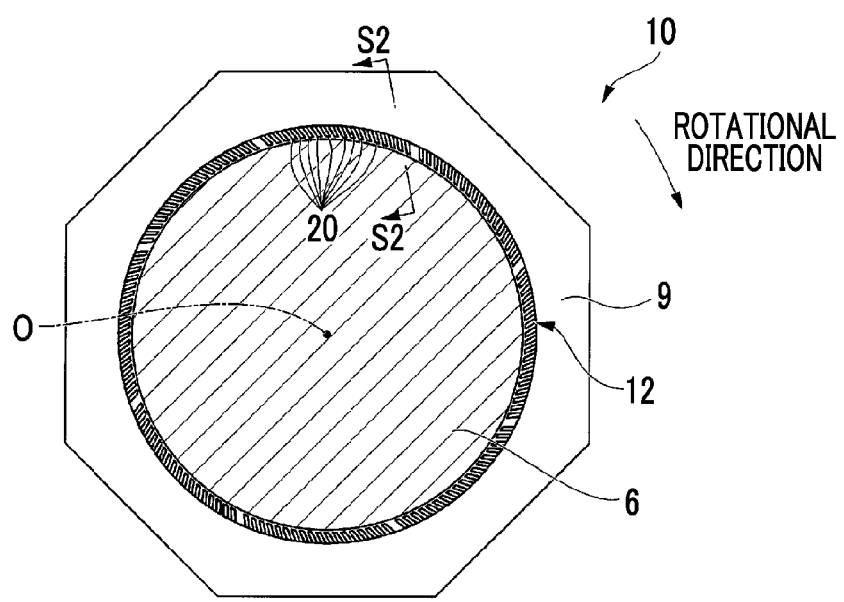
FIG. 2 is a cross-sectional view taken along line S1-S1 of FIG. 1, and is a view showing the schematic structure of a shaft seal device that is seen in the direction of an axis of a rotating shaft.
Figure 3:
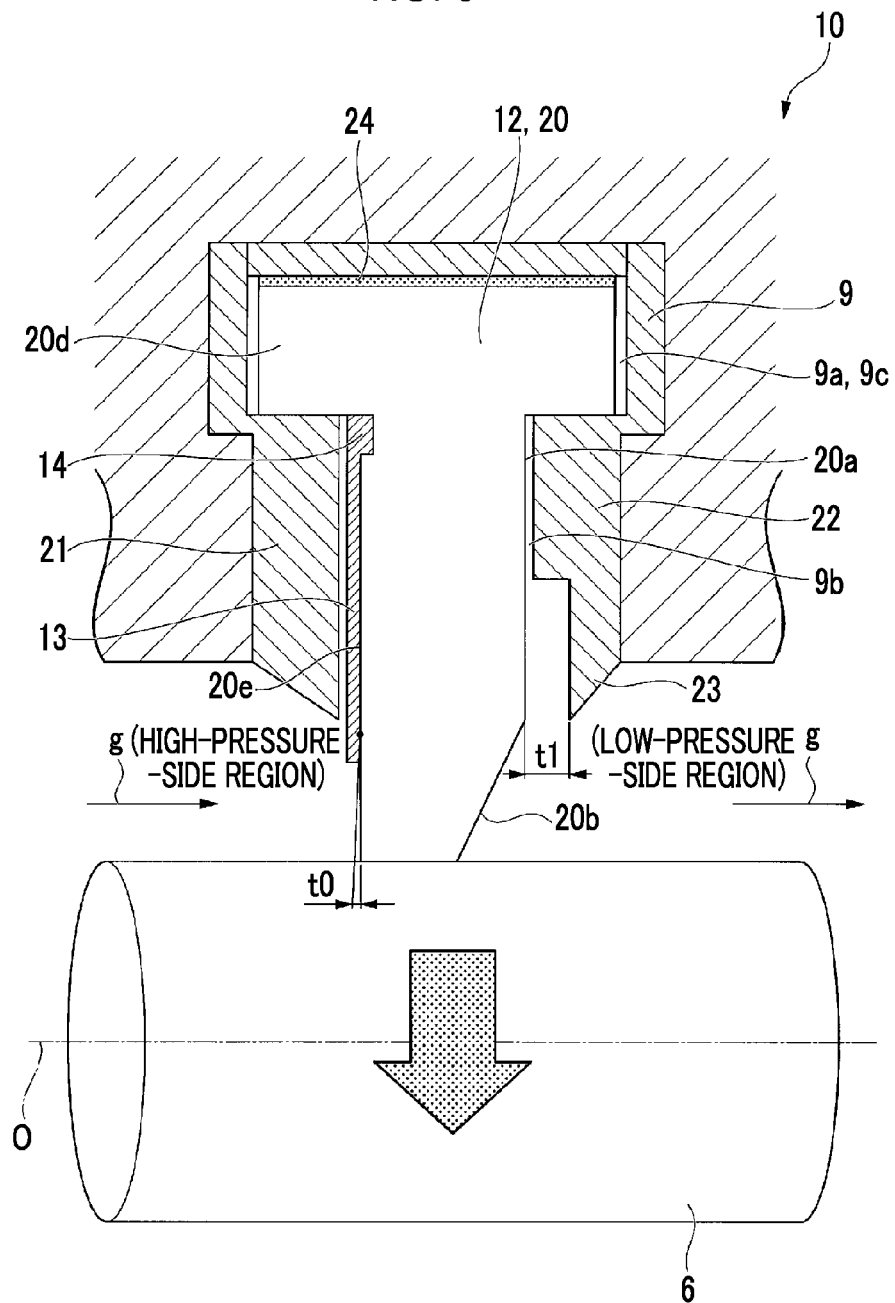
FIG. 3 is a cross-sectional view taken along line S2-S2 of FIG. 2, and is a cross-sectional view of the shaft seal device at a position where the amount of pressing is small.

FIG. 2 is a cross-sectional view taken along line S1-S1 of FIG. 1, and FIG. 3 is a cross-sectional view taken along line S2-S2 of FIG. 2. Meanwhile, the rotating shaft 6 shown in FIG. 3 is schematically shown so that a positional relationship between the shaft seal device 10 and the rotating shaft 6 becomes clear.

As shown in FIGS. 2 and 3, a seal body 12 extending in the circumferential direction is accommodated in a housing 9 supported by the hub shrouds of the annular stator blade groups 5 and the inner peripheral surfaces of the bearing portions 4c, so that the shaft seal device 10 of the turbine 4 is formed.

The seal body 12 includes a plurality of thin-plate seal pieces 20 and a high-pressure-side side plate 13 (first facing surface) that defines a gap between the thin-plate seal piece 20 and the housing 9. The thin-plate seal pieces 20 are laminated with a minute gap therebetween so that the thickness direction of each thin-plate seal piece is parallel to the circumferential direction of the rotating shaft 6. Each thin-plate seal piece 20 is obliquely disposed so that a radially inner end portion of each thin-plate seal piece 20 is positioned on the front side of a radially outer end portion thereof in the rotational direction of the rotating shaft 6. Rear ends of the thin-plate seal pieces 20 are soldered or welded to each other through a connecting portion 24, and front ends thereof become free ends.

The thin-plate seal piece 20 of the seal body 12 is a flat plate-like member that has a predetermined width in the direction of the axis of the rotating shaft 6. Radially inner portions of the thin-plate seal pieces 20 come into sliding contact with the outer peripheral surface of the rotating shaft 6 at an acute angle with a predetermined pre-load so as to slope in the circumferential direction. The thin-plate seal piece 20 is formed in a T shape having a head 20d, and the housing 9 includes a T-shaped accommodation space 9a corresponding to the T shape.

Since the housing 9 is formed so as to surround the outer peripheral side of the rotating shaft 6, the accommodation space 9a is formed so as to also extend in the circumferential direction. As shown in FIG. 3, an opening side, that is, a radially inner portion of the accommodation space 9a of the housing 9 is formed of an internal space 9b that is formed so as to have a small width (a dimension in the direction of the axis O). Further, a space spaced apart from the opening of the accommodation space 9a to the outside in the radial direction, that is, a space positioned outside the internal space 9b in the radial direction is formed of an external space 9c that is formed so as to have a large width. These inner and external spaces 9b and 9c communicate with each other. Furthermore, an open portion of the internal space 9b faces the rotating shaft 6 that is positioned on the inner side in the radial direction.

The internal space 9b is formed so that the dimension of the internal space 9b in the direction of the axis O is slightly larger than the dimension of the thin-plate seal piece 20 in the direction of the axis O (the width of the thin-plate seal piece 20).

Moreover, the high-pressure side of the internal space 9b of the housing 9 in the direction of the axis O is formed of a high-pressure-side side wall 21, and the low-pressure side thereof in the direction of the axis O is formed of a low-pressure-side side wall 22 (second facing surface). That is, the high-pressure-side side wall 21 is a facing surface of the high-pressure-side edge 20e of the thin-plate seal piece 20, and the low-pressure-side side wall 22 is a facing surface of the low-pressure-side edge 20a of the thin-plate seal piece 20. The internal space 9b is formed by the high-pressure-side side wall 21 and the low-pressure-side side wall 22. A predetermined interval is formed between a radially inner end of the high-pressure-side side wall 21 and the rotating shaft 6, and a predetermined interval is formed between a radially inner end of the low-pressure-side side wall 22 and the rotating shaft 6.

The high-pressure-side side plate 13 is interposed between one side, which is opposite to a high-pressure-side region, of the plurality of thin-plate seal pieces 20 and the high-pressure-side side wall 21. The thickness direction of the high-pressure-side side plate 13 is parallel to the direction of the axis O, and the high-pressure-side side plate 13 has the shape of an arched band when seen in the direction of the axis O of the rotating shaft 6. That is, the high-pressure-side side plate 13 includes surfaces facing the direction of the axis O, and is formed so as to extend and curve in the circumferential direction.

The high-pressure-side side plate 13 is joined to the plurality of thin-plate seal pieces 20 at a joint portion 14, which is formed at the radially outer end thereof, by welding or fitting. Accordingly, the surface of the high-pressure-side side plate 13 facing the low-pressure side is fixed so as to cover the high-pressure side of the plurality of thin-plate seal pieces 20. A high-pressure-side clearance t0 between the seal body 12 and the high-pressure-side side wall 21 of the housing 9 is defined by the high-pressure-side side plate 13. The high-pressure-side clearance t0 corresponds to a gap between the seal body 12 and the high-pressure-side side wall 21 of the housing 9 when the high-pressure-side side plate 13 is not provided.

Further, a radially inner end portion of the low-pressure-side side wall 22 is formed of a stepped portion 23 that is spaced apart from the thin-plate seal piece 20 in the direction of the axis O. That is, the low-pressure-side side wall 22 is formed so that a gap between the thin-plate seal piece 20 (seal body 12) and the low-pressure-side side wall 22 on the tip side (radially inner side) of the low-pressure-side side wall 22 is larger than that on the base end side (radially outer side) of the low-pressure-side side wall 22. In other words, a gap (low-pressure-side clearance) between the low-pressure-side edge 20a of the thin-plate seal piece 20 and the low-pressure-side side wall 22 is made as small as possible on the base end side of the thin-plate seal piece 20 by the low-pressure-side side wall 22, and is made large on the tip side of the thin-plate seal piece 20 by the stepped portion 23. The low-pressure-side clearance on the tip side of the thin-plate seal piece 20 is denoted by reference numeral t1.

Here, the high-pressure-side clearance t0 is set to be smaller than the low-pressure-side clearance t1. That is, a gap between the surface of the high-pressure-side side plate 13, which faces the low-pressure side, and the high-pressure-side edge 20e of the seal body 12 is set to be smaller than the low-pressure-side clearance t1.

Meanwhile, the high-pressure-side side plate 13 does not necessarily need to be provided. That is, if the gap between the seal body 12 and the high-pressure-side side wall 21 of the housing 9 is smaller than the low-pressure-side clearance t1, the high-pressure-side side plate 13 may not be provided.

Further, a slope part 20b, which gradually slopes to the high-pressure side (high-pressure side in the direction of the axis O) toward the tip close to the rotor, is formed at the low-pressure-side edge 20a of the thin-plate seal piece 20 of this embodiment. That is, the tip side of the low-pressure-side edge 20a, which is one side of each thin-plate seal piece 20 facing a low-pressure-side region, is formed in a chamfered shape so that the dimension of the tip side of the low-pressure-side edge 20a in the direction of the axis O (the width of the tip side of the low-pressure-side edge 20a) is gradually reduced toward the rotor (rotating shaft 6).

Specifically, the radial position of a radially outer end of the slope part 20b is set to be substantially the same as that of a radially inner end of the low-pressure-side side wall 22. In other words, a region where the width of the thin-plate seal piece 20 is reduced by the slope part 20b is a region that is present on the inner side than the radially inner end of the housing 9 in the radial direction.

Next, the operation of the shaft seal device of this embodiment will be described.

Figure 4:
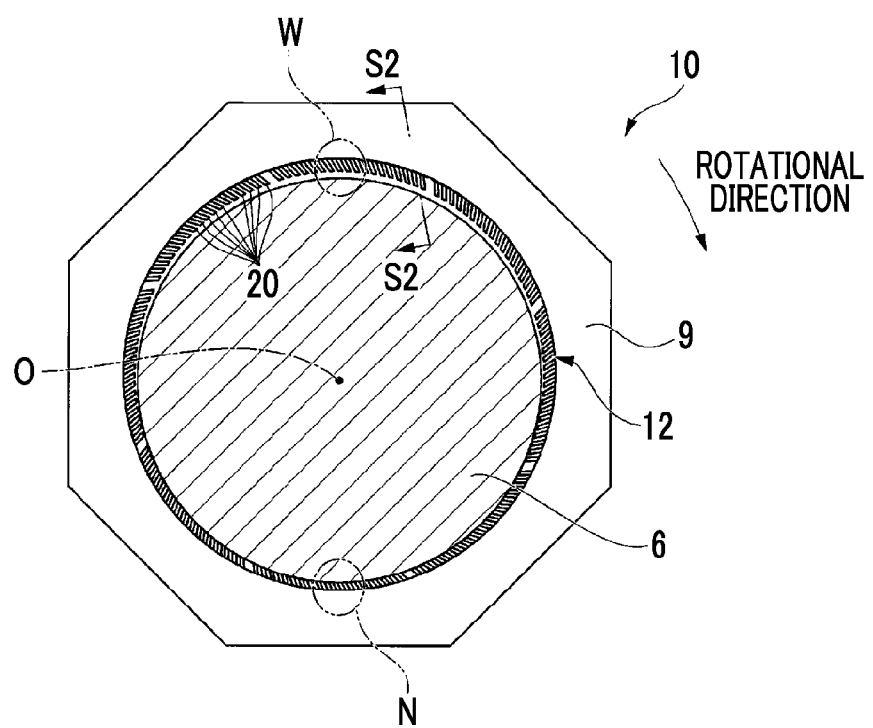
FIG. 4 is a cross-sectional view taken along line S1-S1 of FIG. 1, and is a cross-sectional view illustrating a case in which a relative eccentricity between a rotor and a stator is large.

As shown in FIG. 4, a position (denoted by reference character W) where the rotor and the housing are spaced apart from each other and a position (denoted by reference character N) where the rotor and the housing are close to each other are generated when a relative eccentricity between the rotor and the stator is large. As shown in FIG. 3, a low-pressure-side clearance, which is formed between the low-pressure-side side wall 22 and the thin-plate seal piece 20 at a position where the rotor and the housing are spaced apart from each other, becomes t1. That is, since the state of the thin-plate seal piece 20 becomes a flat state or a state close to the flat state not long after the elimination of the pressing force of the thin-plate seal piece 20, the low-pressure-side clearance t1 becomes a distance between the inner wall of the stepped portion 23 and the low-pressure-side edge 20a of the thin-plate seal piece 20.

Figure 5:
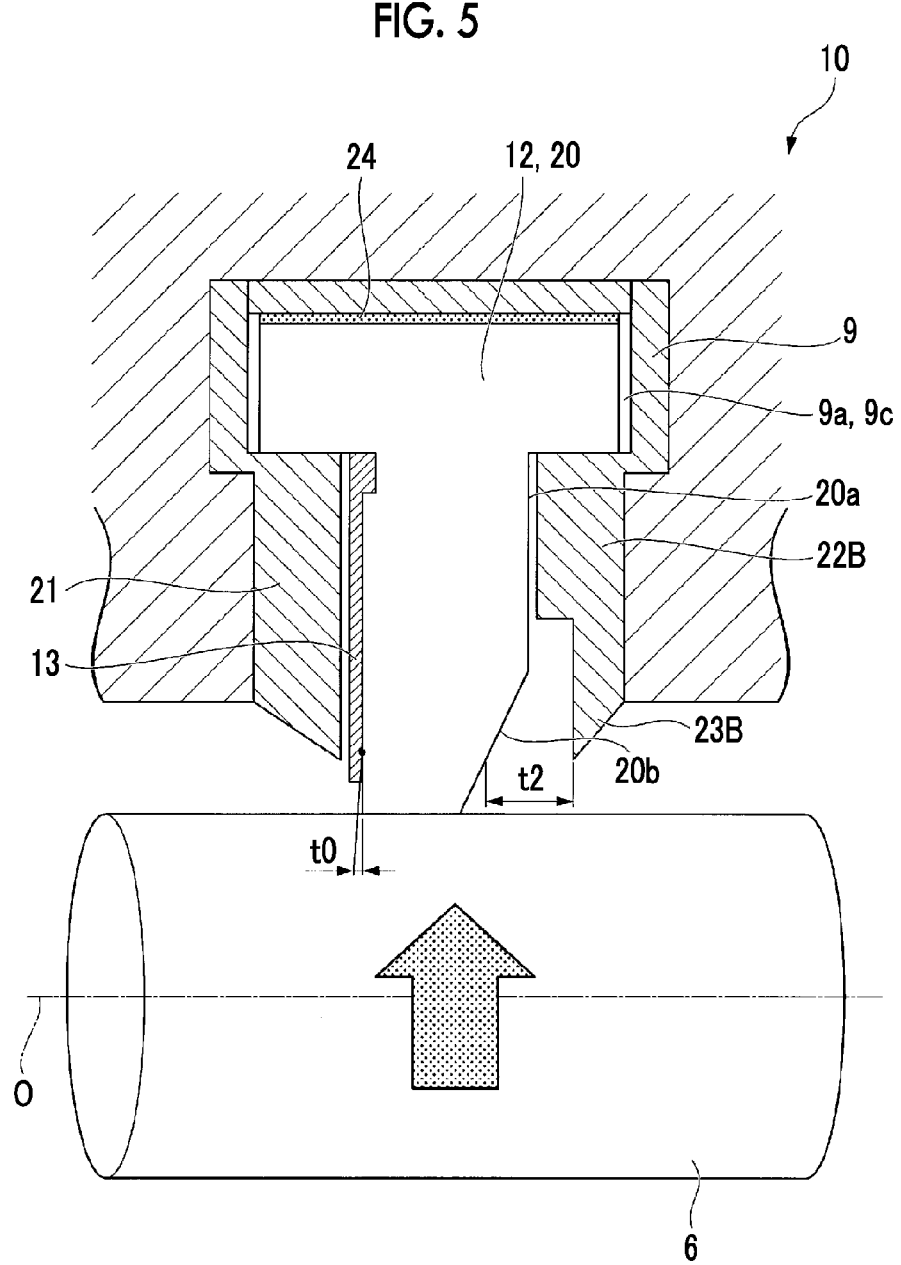
FIG. 5 is a cross-sectional view taken along line S2-S2 of FIG. 2, and is a cross-sectional view of the shaft seal device at a position where the amount of pressing is large.

As shown in FIG. 5, a low-pressure-side clearance, which is formed between the low-pressure-side side wall 22 and the thin-plate seal piece 20 at a position where the rotor and the housing are close to each other, becomes t2 larger than t1. That is, since the thin-plate seal piece 20 is curved due to an increase of the pressing force of the thin-plate seal piece 20, the low-pressure-side clearance t2 becomes a distance between the inner wall of the stepped portion 23 and the slope part 20b of the thin-plate seal piece 20.

In summary, low-pressure-side clearances t1 and t2 are reduced at the position where the rotor and the stator are spaced apart from each other, and are increased at the position where the rotor and the stator are close to each other. That is, as the rotor and the housing become close to each other and the pressing force of the thin-plate seal piece 20 is increased, the low-pressure-side clearances t1 and t2 are increased.

Here, a relationship between the size of the low-pressure-side clearance and a floating force of the seal body 12 will be described.

Figure 6A:
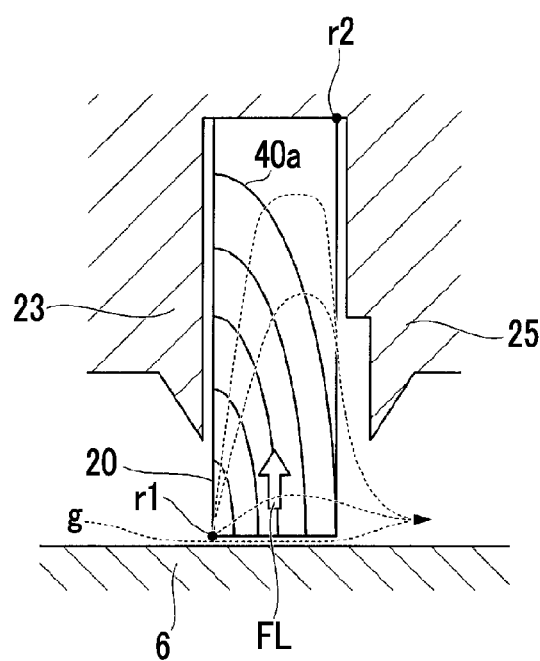
FIG. 6A is a view illustrating the operation of a thin-plate seal piece.

When the gas pressure of working fluid flowing to the low-pressure-side region from the high-pressure-side region is applied to each thin-plate seal piece 20 as shown in FIG. 6A, gas pressure distribution 40a in which gas pressure is highest at an inner periphery-side tip, which is a corner r1 positioned on the high-pressure side, of each thin-plate seal piece 20 and is gradually lowered toward a diagonal corner r2 thereof is formed. Meanwhile, the thin-plate seal piece 20 has a T shape in FIG. 3. However, in FIG. 6, only a rectangular portion to be bent is shown and other portions are not shown for the simplification of description.

Figure 6B:
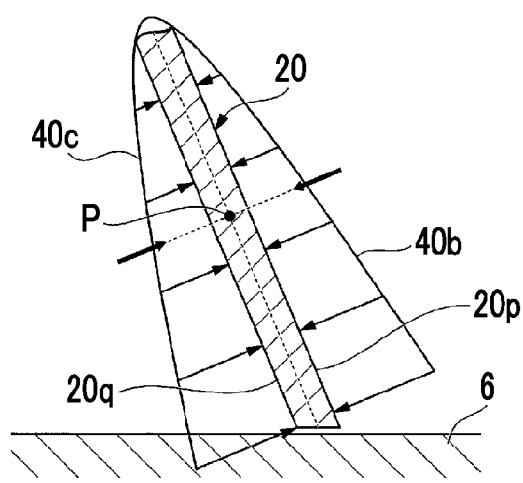
FIG. 6B is a view illustrating the operation of the thin-plate seal piece.

Further, as in a cross-sectional view shown in FIG. 6B taken along the circumferential direction of the rotating shaft 6, the surface of the thin-plate seal piece 20 facing the rotating shaft 6 is referred to as a lower surface 20q and the back side thereof is referred to as an upper surface 20p. Further, when gas pressure applied to the low-pressure-side region from the high-pressure-side region is applied to each thin-plate seal piece 20 and the gas pressure distribution 40a is formed as shown in FIG. 6A, gas pressure is adjusted so that gas pressure applied to the lower surface 20q is higher than gas pressure applied to the upper surface 20p at an arbitrary position along the cross-section of each thin-plate seal piece 20.

In this case, the working fluid g, which flows to the low-pressure-side region from the high-pressure-side region, flows in from a gap between the high-pressure-side side wall 21 and the outer peripheral surface of the rotating shaft 6. Furthermore, as shown in FIG. 6A, the working fluid g flows between the outer peripheral surface of the rotating shaft 6 and the inner periphery-side tip of the thin-plate seal piece 20 and radially flows toward the corner r2 from the corner r1 along the upper and lower surfaces 20p and 20q of the thin-plate seal piece 20. Since the working fluid g flows as described above, a low-pressure region is widened toward an outer periphery-side base end of the thin-plate seal piece 20. For this reason, as shown in FIG. 6B, gas pressure distributions 40b and 40c of the gas pressure applied perpendicular to the upper and lower surfaces 20p and 20q of each thin-plate seal piece 20 become a triangular distribution in which gas pressure is increased toward the inner periphery-side tip of the thin-plate seal piece 20 and is reduced toward the outer periphery-side base end of the thin-plate seal piece 20.

The gas pressure distributions 40b and 40c on the respective upper and lower surfaces 20p and 20q have substantially the same shape. However, since each thin-plate seal piece 20 is disposed so that an angle between each thin-plate seal piece 20 and the peripheral surface of the rotating shaft 6 becomes an acute angle, relative positions of the respective gas pressure distributions 40b and 40c on the upper and lower surfaces 20p and 20q deviate from each other. Accordingly, a difference in the gas pressure on the upper and lower surfaces 20p and 20q at an arbitrary point P from the outer periphery-side base end of the thin-plate seal piece 20 toward the inner periphery-side tip thereof is generated. That is, gas pressure applied to the lower surface 20q of the thin-plate seal piece 20 is higher than gas pressure applied to the upper surface 20p. Accordingly, a floating force FL is generated in a direction where the inner periphery-side tip of the thin-plate seal piece 20 floats from the rotating shaft 6.

When a pressure difference is made to be generated between the upper and lower surfaces 20p and 20q of each thin-plate seal piece 20 as described above, a floating force FL is applied to each thin-plate seal piece 20. Accordingly, each thin-plate seal piece 20 is deformed so that the inner periphery-side tip of the thin-plate seal piece 20 floats from the outer peripheral surface of the rotating shaft 6. That is, when the rotating shaft 6 stops, the inner periphery-side tip of the thin-plate seal piece 20 comes into contact with the peripheral surface of the rotating shaft 6 with a predetermined pre-load. However, since the floating force FL is applied to the inner periphery-side tip of the thin-plate seal piece 20 when the rotating shaft 6 is rotated, the thin-plate seal piece 20 floats from the rotating shaft 6 and does not come into contact with the rotating shaft 6. As a result, a predetermined seal clearance is formed.

Here, when the low-pressure-side clearance is made to be larger than the high-pressure-side clearance, gas g, which flows to the low-pressure-side region from the high-pressure-side region through the thin-plate seal piece 20, is likely to flow and spread toward a diagonal corner along the upper and lower surfaces 20p and 20q of each thin-plate seal piece 20 during the application of pressure from the high-pressure side. That is, as the low-pressure-side clearance is increased, a floating force is increased.

According to the embodiment, the slope part 20b is formed at the low-pressure-side edge 20a of the thin-plate seal piece 20, and the low-pressure-side clearance is increased as the amount of pressing is increased. Accordingly, since the floating force of the thin-plate seal piece 20 is increased as the amount of pressing is increased, it is possible to prevent the wear of the thin-plate seal piece 20. That is, even when the rotating shaft 6 is made eccentric, it is possible to reduce a difference in the amount of pressing to the thin-plate seal piece 20.

Further, since the floating force of the thin-plate seal piece 20 is reduced when the amount of pressing is small, it is possible to suppress leakage.

Furthermore, since the high-pressure-side clearance t0 is set to be smaller than the low-pressure-side clearance t1, it is easy to control pressure between the thin-plate seal pieces 20 that is caused by the low-pressure-side clearance changed by the slope part 20b of the low-pressure-side edge 20a.

Moreover, since the stepped portion 23 is formed on the tip side of the low-pressure-side side wall 22 of the housing 9, it is possible to restrict the deformation of the thin-plate seal piece 20 on the base end side of the low-pressure-side side wall 22 while increasing the low-pressure-side clearance on the tip side of the low-pressure-side side wall 22.

Further, since the slope part 20b is formed at the low-pressure-side edge 20a, the stiffness of the thin-plate seal piece 20 deteriorates. Accordingly, since resistance to a force generated at the thin-plate seal piece 20 is reduced, it is possible to improve the followability of the shaft seal device 10 when the rotating shaft 6 is made eccentric.

Furthermore, since the slope part 20b is formed at the low-pressure-side edge 20a, it is possible to reduce the torsion of the thin-plate seal piece 20.

Second Embodiment

A shaft seal device according to a second embodiment of the invention will be described below with reference to the drawings. Meanwhile, in this embodiment, a difference between the above-mentioned first embodiment and this embodiment will be described mainly and the description of the same portion as the first embodiment will be omitted.

A tip side of a stepped portion 23B of a low-pressure-side side wall 22B of a housing 9B of this embodiment slopes toward the high-pressure side in the direction of an axis toward a radially inner side. Specifically, the tip side of the stepped portion 23B slopes along a slope part 20b of a thin-plate seal piece 20, and is formed so that a gap between the stepped portion 23B and the slope part 20b of the thin-plate seal piece 20 is constant.

Next, the operation of the shaft seal device 10B according to this embodiment will be described.

Figure 7:
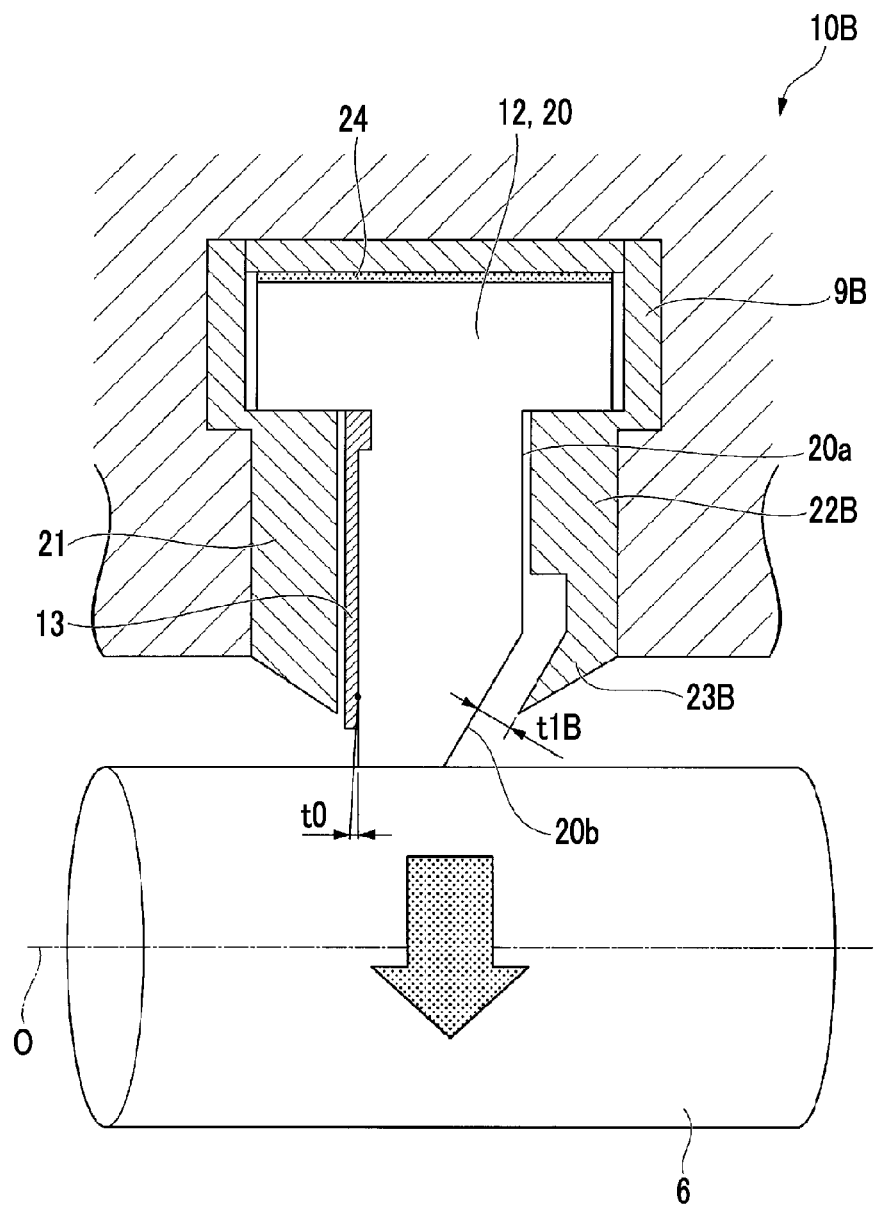
FIG. 7 is a cross-sectional view of a shaft seal device according to a second embodiment of the invention at a position where the amount of pressing is small.

As shown in FIG. 7, a low-pressure-side clearance, which is formed between the low-pressure-side side wall 22B and the thin-plate seal piece 20 at a position where the rotor and the housing are spaced apart from each other and the amount of pressing is small, becomes t1B.

Figure 8:
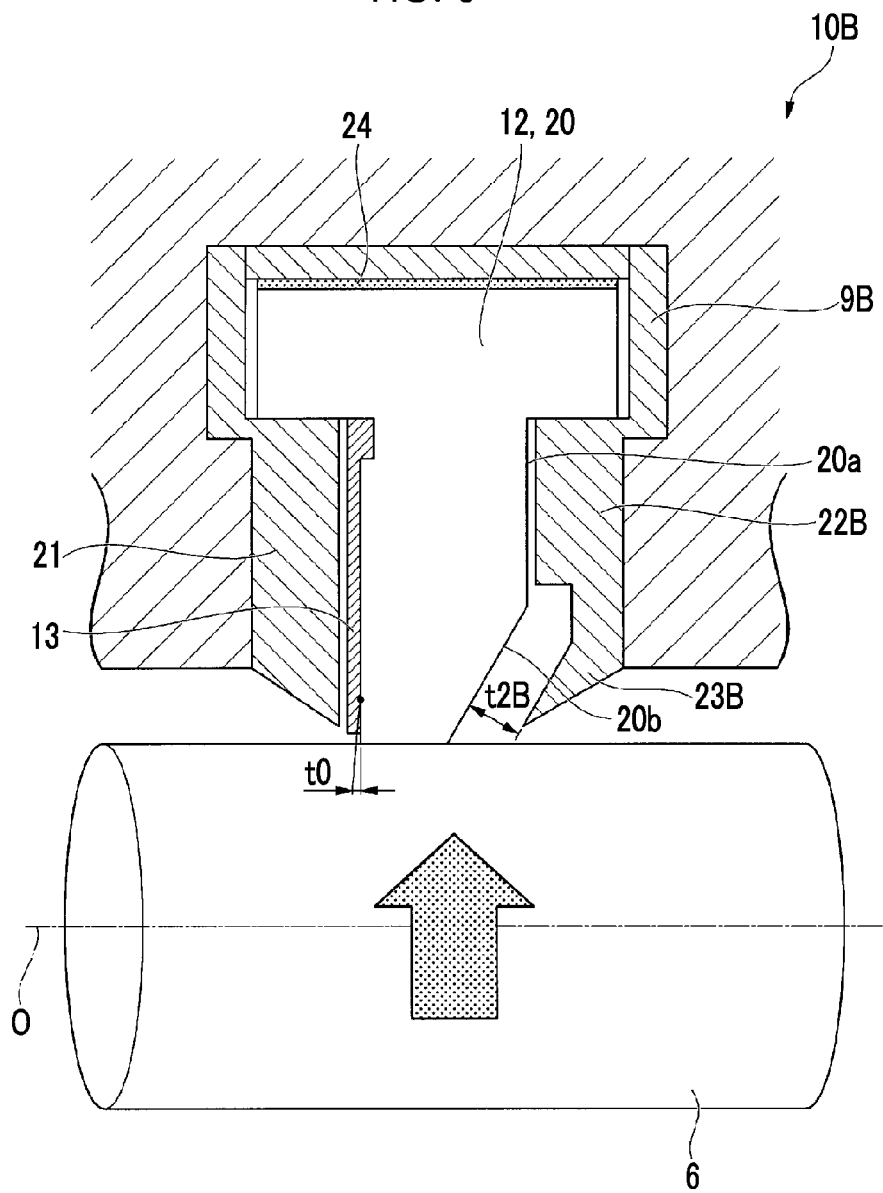
FIG. 8 is a cross-sectional view of a shaft seal device according to a second embodiment of the invention at a position where the amount of pressing is large.
Figure 9:
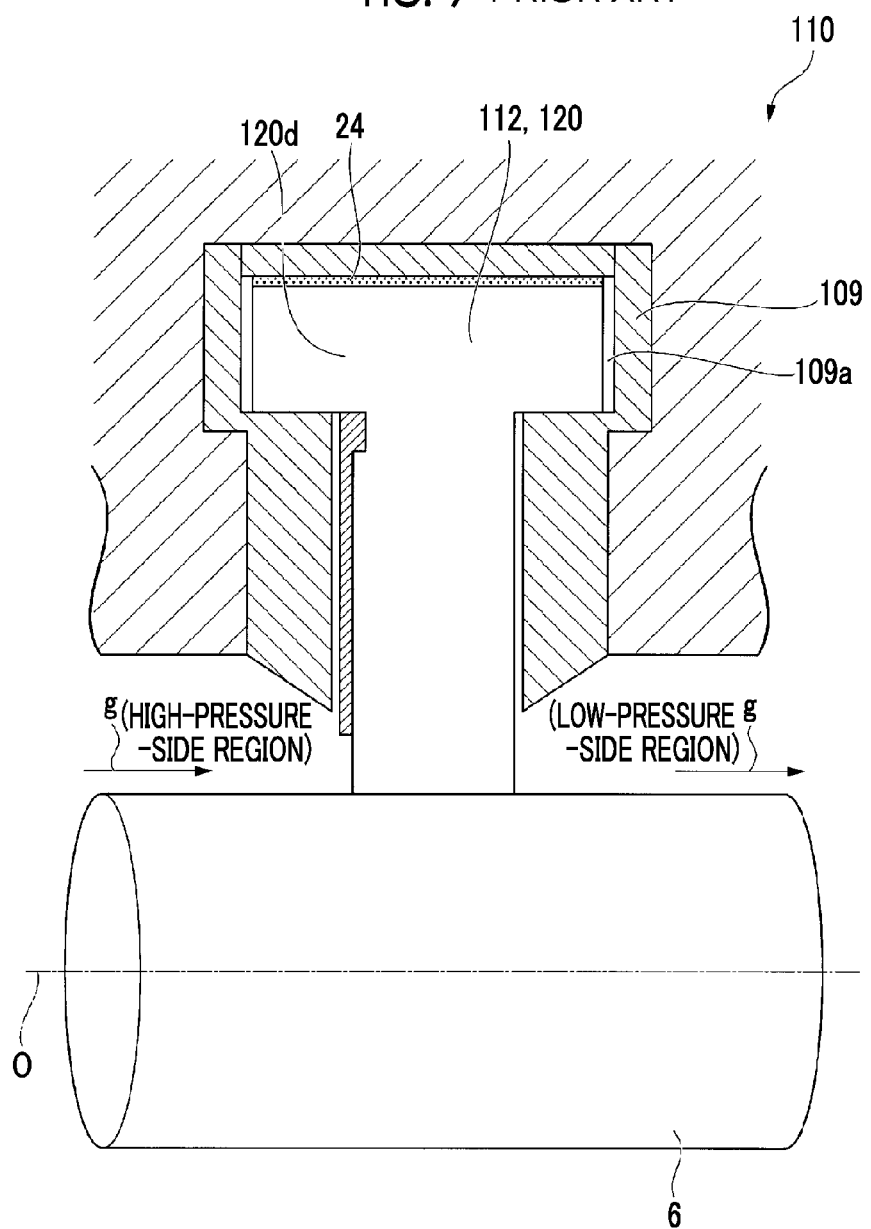
FIG. 9 is a cross-sectional view of a shaft seal device in the related art in a cross-section including an axis of a rotating shaft.
Figure 10:
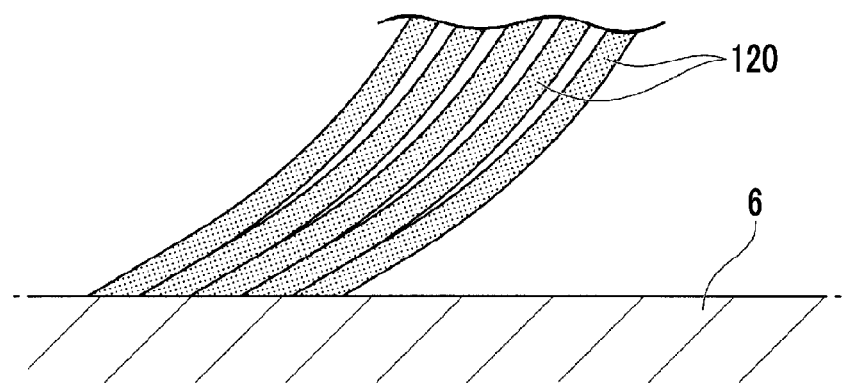
FIG. 10 is a detail view illustrating the operation of the shaft seal device in the related art, and is a view showing a thin-plate seal piece that is seen in the direction of the axis of the rotating shaft.
Figure 11:
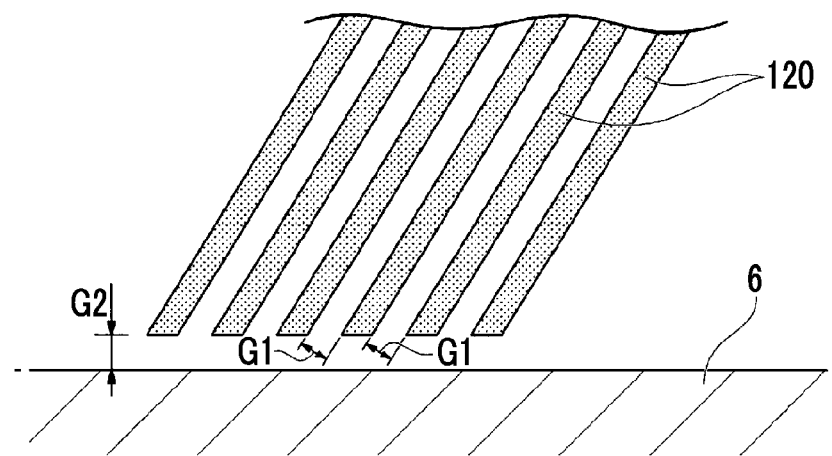
FIG. 11 is a detail view illustrating the operation of the shaft seal device in the related art, and is a view showing the thin-plate seal piece that is seen in the direction of the axis of the rotating shaft.

As shown in FIG. 8, a low-pressure-side clearance, which is formed between the low-pressure-side side wall 22B and the thin-plate seal piece 20 at a position where the rotor and the housing are close to each other and the amount of pressing is large, becomes t2B larger than t1B.

Here, since the stepped portion 23B of this embodiment slopes in the same sloping direction as the slope part 20b, a difference between t1B and t2B is small in comparison with the first embodiment. That is, the change of the low-pressure-side clearance is small at the position where the rotor and the housing are spaced apart from each other and the position where the rotor and the housing are close to each other.

According to the embodiment, since the shape of the stepped portion 23B is set to a shape along the slope part 20b, it is possible to adjust the amount of change of the low-pressure-side clearance that is caused by the change of the amount of pressing.

Meanwhile, the technical scope of the invention is not limited to the above-mentioned embodiments, and may have various modifications without departing from the scope of the invention.

The stepped portion has been formed at the low-pressure-side side wall of each of the embodiments, but the stepped portion may not be formed so that a gap between the thin-plate seal piece and the low-pressure-side side wall is constant.

Further, an example in which the low-pressure-side clearance is defined by the stepped portion has been described in each of the embodiments, but a side plate having a shape equivalent to the shape of the stepped portion may be disposed.

According to this shaft seal device, the floating force of the thin-plate seal piece is increased as the amount of pressing is increased. Accordingly, it is possible to prevent the wear of the thin-plate seal piece. Furthermore, since the floating force of the thin-plate seal piece is reduced when the amount of pressing is reduced, it is possible to suppress leakage.

REFERENCE SIGNS LIST

1: GAS TURBINE (ROTARY MACHINE)
2A, 4A: ROTOR
2B, 4B: STATOR
6: ROTATING SHAFT
9: HOUSING
10: SHAFT SEAL DEVICE
12: SEAL BODY
13: HIGH-PRESSURE-SIDE SIDE PLATE (FIRST FACING SURFACE)
20: THIN-PLATE SEAL PIECE
20a: LOW-PRESSURE-SIDE EDGE
20b: SLOPE PART
21: HIGH-PRESSURE-SIDE SIDE WALL
22: LOW-PRESSURE-SIDE SIDE WALL (SECOND FACING SURFACE)
24: CONNECTING PORTION
t0: HIGH-PRESSURE-SIDE CLEARANCE
t1, t2: LOW-PRESSURE-SIDE CLEARANCE

The invention claimed is:

1. A shaft seal device that partitions a space between a rotor and a stator into a high-pressure side and a low-pressure side, the shaft seal device comprising:
a seal body that includes a plurality of thin-plate seal pieces extending toward the rotor from the stator and laminated in a circumferential direction of the rotor; and
a housing that is fixed to the stator and holds the seal body so as to surround the seal body from the outside in a radial direction, and includes a first facing surface facing a high-pressure-side edge of the seal body and a second facing surface facing a low-pressure-side edge of the seal body,
wherein the housing has a stepped portion at a tip side of a low-pressure-side side wall of the housing and at a radially inner end portion of the low-pressure-side side wall, the stepped portion being spaced apart from the seal body in a direction of an axis of the rotor,
a high-pressure-side clearance between the seal body and the first facing surface is set to be smaller than a low-pressure-side clearance between the seal body and the second facing surface, a slope part, which gradually slopes to the high-pressure side toward a tip close to the rotor, is formed at the low-pressure-side edge of each thin-plate seal piece of the seal body, and the tip side of the stepped portion slopes along the slope part of a thin-plate seal piece, and is formed so that a gap between the stepped portion and the slope part of the thin-plate seal piece is constant.

2. The shaft seal device according to claim 1,
wherein the slope part is formed from the tip to a position corresponding to an end of the second facing surface close to the rotor.

3. The shaft seal device according to claim 1,
wherein a high-pressure-side side plate, which defines the high-pressure-side clearance, is mounted on the high-pressure-side edge.

4. A rotary machine that includes the shaft seal device according to claim 1.

* * * * *